US010545543B2

(12) United States Patent
Fomin et al.

(10) Patent No.: US 10,545,543 B2
(45) Date of Patent: Jan. 28, 2020

(54) ASSEMBLY FOR MOUNTING TOUCH SENSOR WITHIN DEVICE CASE

(71) Applicant: TEXAS INSTRUMENTS INCORPORATED, Dallas, TX (US)

(72) Inventors: Evgeny Fomin, San Carlos, CA (US); Dave Hermiller, Escondido, CA (US); Christopher A. Oberhauser, San Jose, CA (US); James Catt, Santa Clara, CA (US); Paul Smith, San Diego, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/721,720

(22) Filed: Sep. 29, 2017

(65) Prior Publication Data

US 2018/0088635 A1 Mar. 29, 2018

Related U.S. Application Data

(60) Provisional application No. 62/401,874, filed on Sep. 29, 2016.

(51) Int. Cl.
G06F 1/16 (2006.01)
G06F 1/18 (2006.01)
G06F 3/044 (2006.01)

(52) U.S. Cl.
CPC ............ *G06F 1/183* (2013.01); *G06F 1/1656* (2013.01); *G06F 3/044* (2013.01)

(58) Field of Classification Search
None
See application file for complete search history.

(56) References Cited

U.S. PATENT DOCUMENTS 5,917,165 A * 6/1999 Platt ................... H03K 17/962
200/511
2008/0136792 A1 * 6/2008 Peng ................... G06F 3/0416
345/174

(Continued)

*Primary Examiner* — Xanthia C Cunningham
(74) *Attorney, Agent, or Firm* — John R. Pessetto; Charles A. Brill; Frank D. Cimino

(57) ABSTRACT

A touch sensor mounting assembly includes a carrier with a front-side surface for attaching a touch sensor circuit (such as a flex circuit board), and a back-side spring structure. The touch sensor mounting assembly can be used for mounting at least one touch sensor in a device case with at least on touch button area defined on a surface of the device case. The touch sensor mounting assembly can include a carrier including a front-side sensor-attach surface, and a back-side spring structure including at least two spring arms integral with the carrier. Touch sensor circuitry can be mounted on the front-side sensor-attach surface of the carrier, such that when, the touch sensor mounting assembly is installed in the device case adjacent the at least one touch button area, the back-side spring arms are flexed to urge the carrier with front-side mounted touch sensor circuitry toward an interior side of the touch button area of the device case. In one implementation, the devices case includes first and second adjacent touch button areas (such as up/dn), and the carrier includes a front-side sensor-attach surface dimensioned for respective first and second touch sensor circuits, and can include a back-side spring structure with dual crossed spring arms for each of the first and second touch sensor circuits.

5 Claims, 7 Drawing Sheets

(56) References Cited

U.S. PATENT DOCUMENTS

| | | | |
|---|---|---|---|
| 2010/0300772 A1* | 12/2010 | Lee | G06F 3/03547 |
| | | | 178/18.06 |
| 2011/0270219 A1* | 11/2011 | Friedli | A61M 5/14244 |
| | | | 604/506 |
| 2013/0099802 A1* | 4/2013 | Hsieh | G06F 3/044 |
| | | | 324/661 |
| 2014/0374230 A1* | 12/2014 | Shaw | G06F 1/1632 |
| | | | 200/5 A |
| 2016/0064162 A1* | 3/2016 | Kuo | H01H 3/122 |
| | | | 200/341 |
| 2016/0104586 A1* | 4/2016 | Kuo | H01H 13/36 |
| | | | 200/341 |
| 2016/0117022 A1* | 4/2016 | Kim | G06F 3/044 |
| | | | 345/174 |
| 2017/0371380 A1* | 12/2017 | Oberhauser | G06F 1/1692 |
| 2018/0101040 A1* | 4/2018 | Liu | G06F 1/16 |

* cited by examiner

ASSEMBLY FOR MOUNTING TOUCH SENSOR WITHIN DEVICE CASE

CROSS-REFERENCE TO RELATED APPLICATIONS

Priority is claimed under 37 CFR 1.78 and 35 USC 119(e) to U.S. Provisional Application 62/401,874, filed 2016 Sep. 29, which is incorporated by reference.

BACKGROUND

Mobile/portable personal communications/computing devices commonly include physical/mechanical buttons/keys integrated into a device case (such as on a side-wall edge). Such mechanical touch buttons/keys are distinguished from, for example, capacitive touch buttons/keys defined on a device screen.

Touch sensing technology can be used to replace physical/mechanical buttons with touch buttons defined on an exterior touch surface/segment of a device case (touch button area). Touch sensing can be used to detect touch-press of a touch button, such as based on deflection/displacement of the touch button area, as detected by a touch sensor mounted/installed within a device case at the interior side of the touch button area. Touch sensing can be based on inductive sensing with an inductor coil sensor, or capacitive sensing with a capacitive electrode sensor.

While this Background information references touch input for mobile/personal communication/computing devices, this Patent Disclosure is more generally directed to input button/keys based on touch technology.

BRIEF SUMMARY

This Brief Summary is provided as a general introduction to the Disclosure provided by the Detailed Description and Drawings, summarizing aspects and features of the Disclosure. It is not a complete overview of the Disclosure, and should not be interpreted as identifying key elements or features of, or otherwise characterizing or delimiting the scope of, the disclosed invention.

The Disclosure describes apparatus and methods for a touch sensor mounting assembly that includes a carrier with a front-side surface for attaching a touch sensor circuit, and a back-side spring structure.

According to aspects of the Disclosure, the touch sensor mounting assembly can be used for mounting at least one touch sensor in a device case with at least on touch button area defined on a surface of the device case. The touch sensor mounting assembly can include a carrier including a front-side sensor-attach surface, and a back-side spring structure including at least two spring arms integral with the carrier. Touch sensor circuitry can be mounted on the front-side sensor-attach surface of the carrier, such that when, the touch sensor mounting assembly is installed in the device case adjacent the at least one touch button area, the back-side spring arms are flexed to urge the carrier with front-side mounted touch sensor circuitry toward an interior side of the touch button area of the device case.

Other aspects and features of the invention claimed in this Patent Document will be apparent to those skilled in the art from the following Disclosure.

BRIEF DESCRIPTION OF THE DRAWINGS

FIG. 1B illustrates an example flex sensor [130] including sensor PCB 131 with trace interconnect [134, 136, 138], and FIG. 1C is a detail illustration for one of the dual spring arm configurations in FIG. 1A [120A/1206].

FIG. 2 illustrates an example alternate spring arm configuration with single spring arms [220A and 220C] extending from the outer ends of the carrier stiffening rib [211];

FIG. 3 illustrates an example alternate spring arm configuration with single spring arms [320A and 320C] extending from the outer ends of the carrier stiffening rib [311], secured with end flanges rather than bolts; and FIG. 4 illustrates an example alternate spring arm configuration with single spring arms [320B and 320D] extending from the inner portion of the carrier stiffening rib [311] including bolt-attachment.

FIG. 5 illustrates an alternate example dual spring-arm retainer configuration with dual spring-arm retainers [540A/540B] secured to mounting posts [52A/52B]; and FIG. 6 illustrates an alternate example spring-arm retainer [640] configuration with a retainer cross-bar [643] configured to use the PCB [62] as a retention stop.

DETAILED DESCRIPTION

This Description and the Drawings constitute a Disclosure for touch sensor mounting assembly, including describing design examples (example implementations), and illustrating various technical features and advantages.

In brief overview, in example embodiments, a touch sensor mounting assembly includes a carrier with a front-side surface for attaching a touch sensor circuit (such as a flex circuit board), and a back-side spring structure. The touch sensor mounting assembly can be used for mounting at least one touch sensor in a device case with at least on touch button area defined on a surface of the device case. The touch sensor mounting assembly can include a carrier including a front-side sensor-attach surface, and a back-side spring structure including at least two spring arms integral with the carrier. Touch sensor circuitry can be mounted on the front-side sensor-attach surface of the carrier, such that when, the touch sensor mounting assembly is installed in the device case adjacent the at least one touch button area, the back-side spring arms are flexed to urge the carrier with front-side mounted touch sensor circuitry toward an interior side of the touch button area of the device case. In one implementation, the devices case includes first and second adjacent touch button areas (such as up/dn), and the carrier includes a front-side sensor-attach surface dimensioned for respective first and second touch sensor circuits, and can include a back-side spring structure with dual crossed spring arms for each of the first and second touch sensor circuits.

Figure 5:
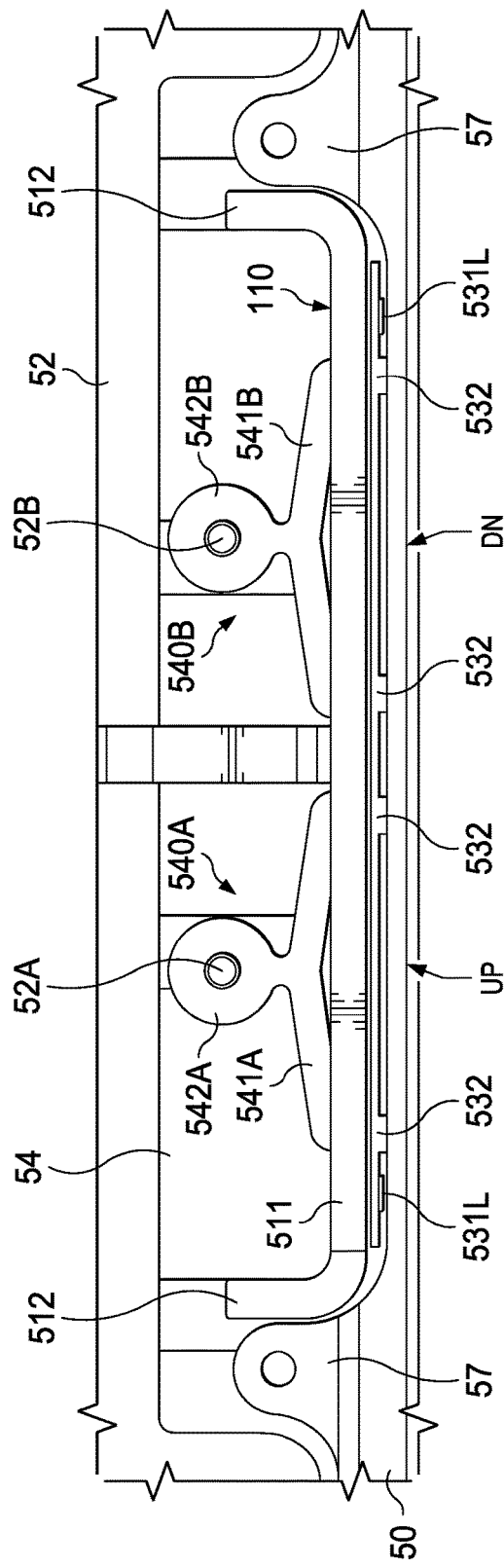
FIGS. 5-6 illustrate alternate example implementations of a touch sensor mounting assembly including back-side spring arm retainer(s)
Figure 6:
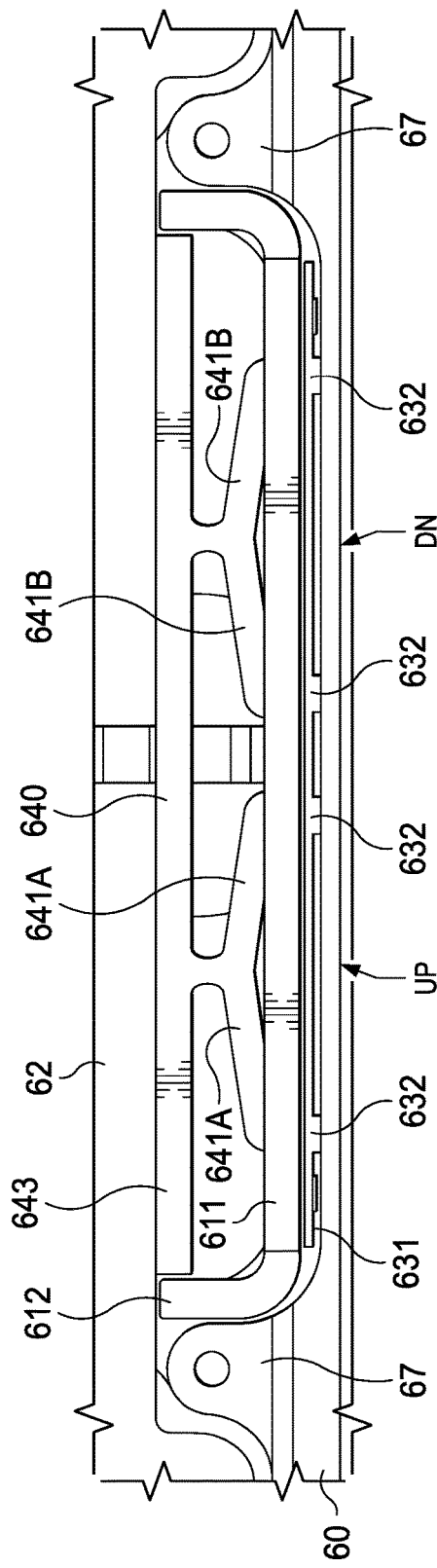
Figure 7:
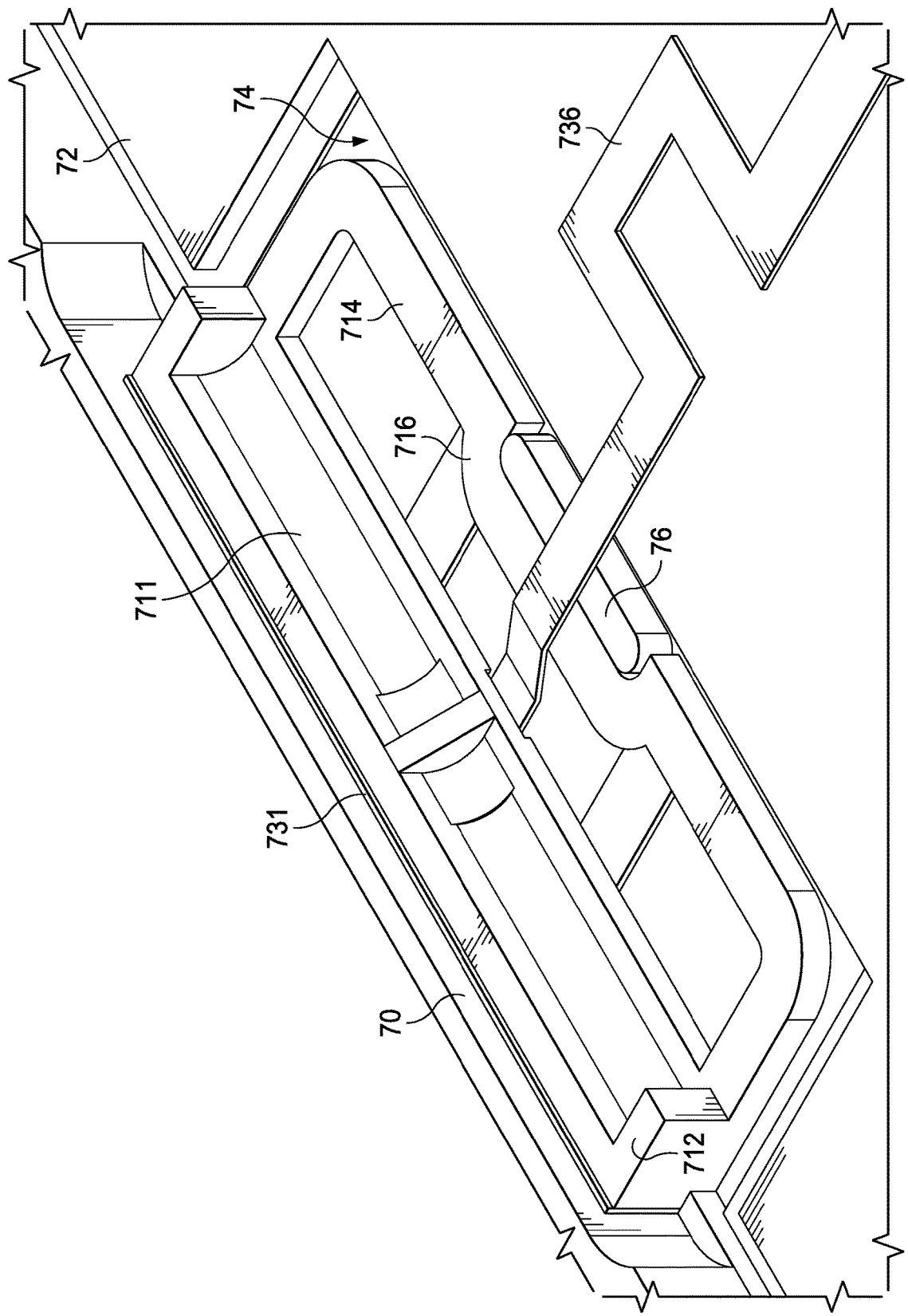
FIGS. 7-8 illustrate alternate example implementations of a touch sensor mounting assembly including a carrier spring cross-rib [714/814], including a retention-tab indent [716/816] for engaging a retention tab [76/86].
Figure 8:
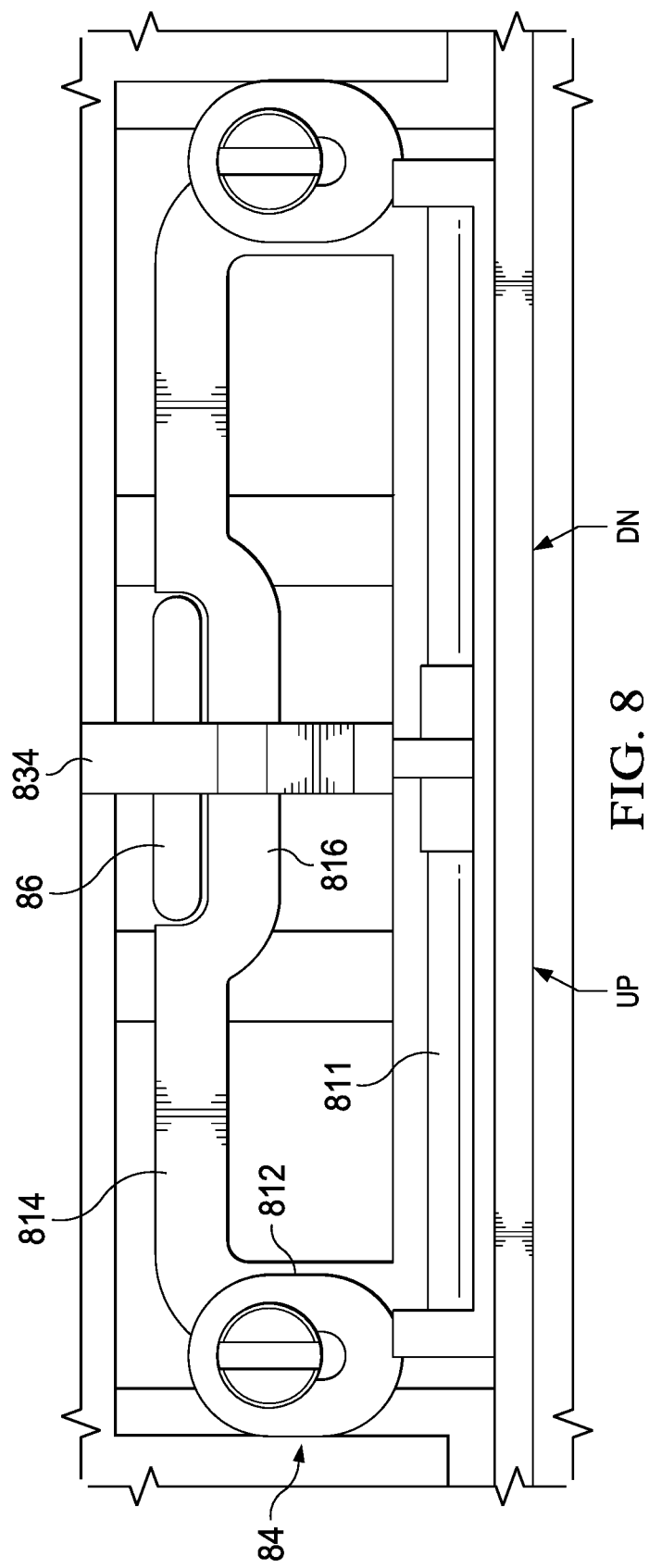

A touch sensor mounting assembly according to this Disclosure includes a carrier with a front-side surface for attaching a touch sensor circuit (such as a flex circuit board), and a back-side spring structure configured such that, when the touch sensor mounting assembly (also referred to as a module) is installed, the back-side spring structure is flexed to urge the carrier (with front-side attached touch sensor circuit board) to contact the interior of the device case opposite the touch button area. FIGS. 1A-1C and FIGS. 2-4 illustrate example implementations of a touch sensor mounting assembly for dual touch button sensors (UP/DN), including a carrier with integral back-side spring arms. FIGS. 5-6 illustrate example implementations of a touch sensor mounting assembly including back-side spring arm retainer(s). FIGS. 7-8 illustrate example implementations of a touch sensor mounting assembly including a carrier spring cross-rib with a retention-tab indent for engaging a retention tab.

Figure 1A:
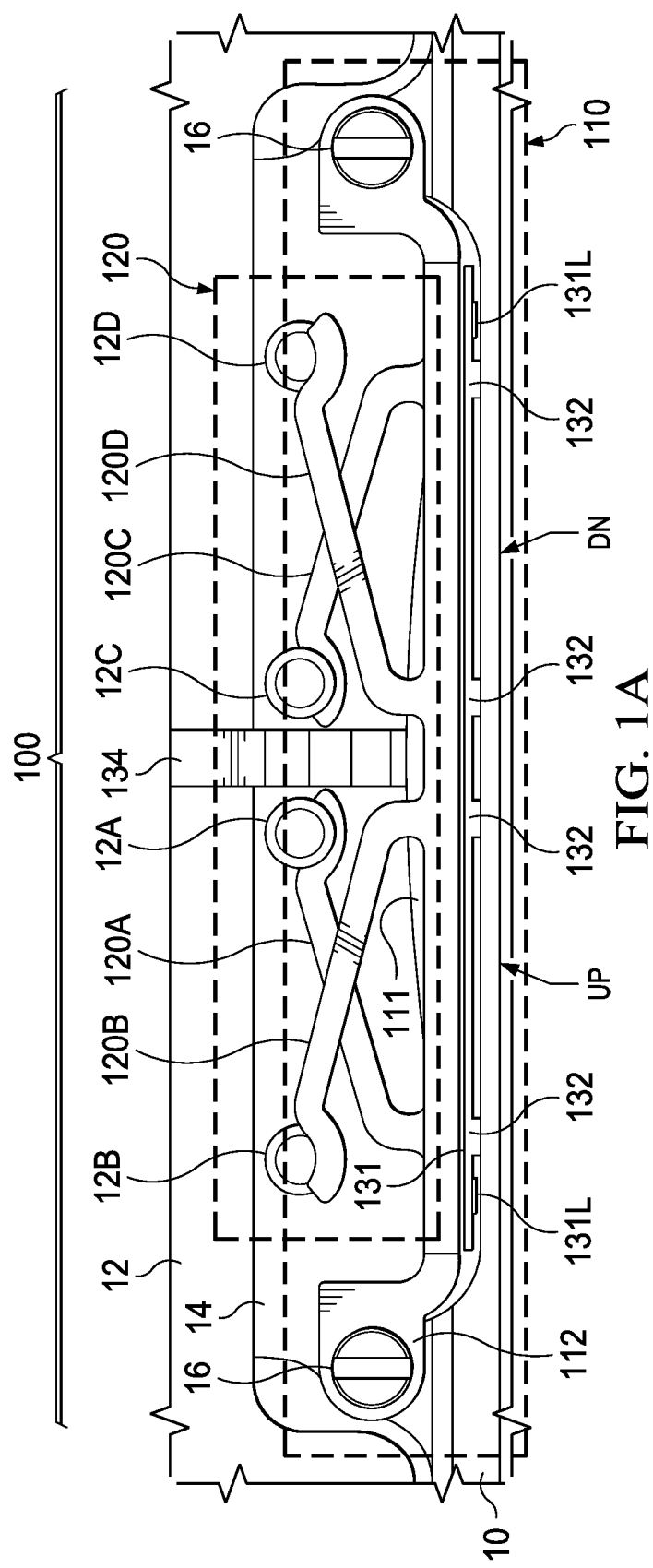
FIGS. 1A-1C illustrates an example touch sensor mounting assembly [100] for dual touch button sensors (UP/DN), including a carrier [110] with a carrier stiffening rib [111] for attaching/mounting a flex sensor PCB [131], the carrier including integral back-side dual spring arms for each touch button sensor [120A/C and 120B/D], configured to engage respective mounting posts [12A-B and 12C-D]
Figure 1B:
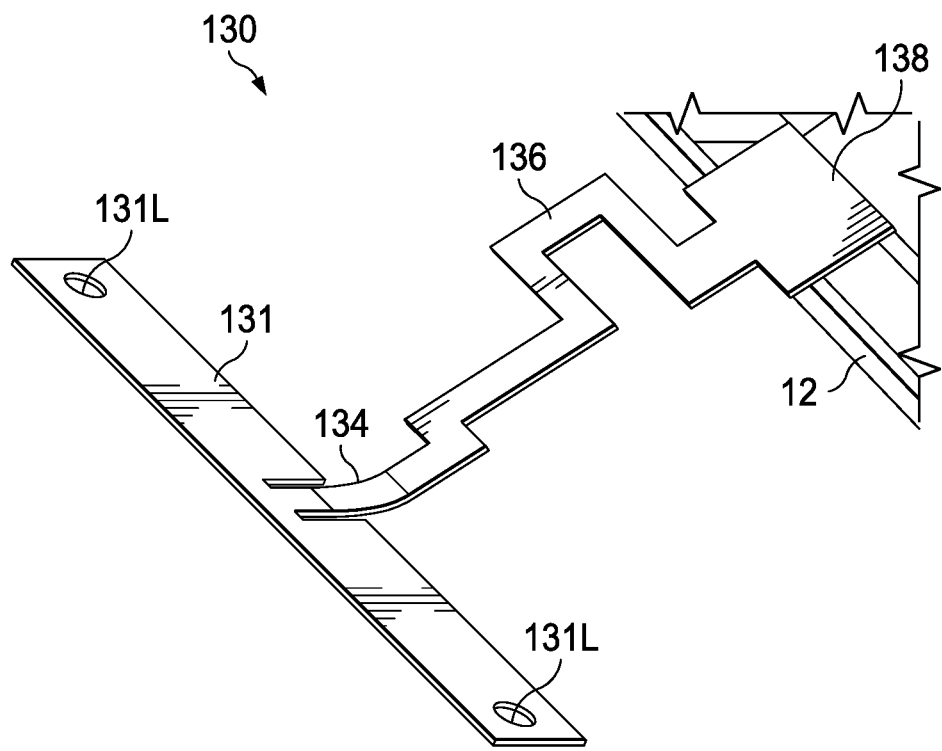
Figure 1C:
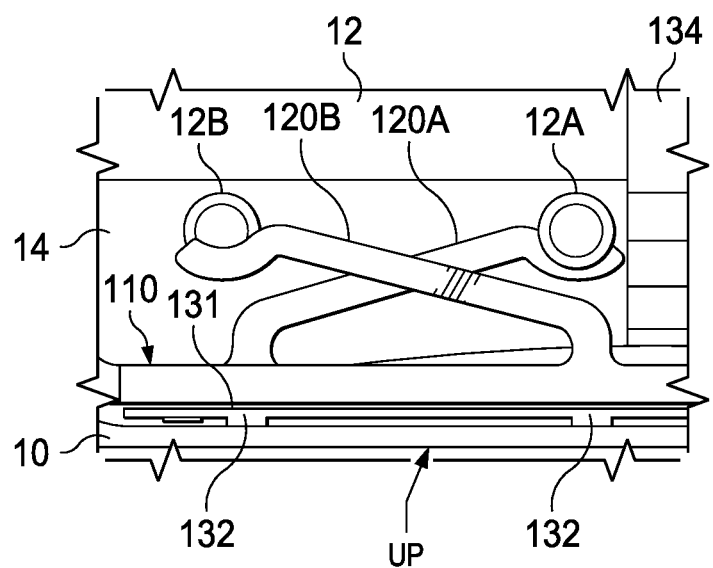

FIGS. 1A-1C illustrates an example touch sensor mounting assembly 100 for dual touch button sensors.

Touch sensor mounting assembly 100 can be used to mount dual touch button sensors within a device case, such as at a sidewall 10. Dual touch buttons, such as UP/DN, are defined on the device sidewall 10. The device includes PCB (printed circuit board) 12, including a cut-out portion 14 adjacent the dual touch buttons UP/DN.

Referring to FIGS. 1A-1B, touch sensor mounting assembly 100 includes a carrier 110 with a carrier stiffening rib 111 for attaching/mounting dual a flex sensor PCB 131. The flex sensor PCB is mounted/adhered to the front-side of the carrier stiffening rib 111.

The carrier includes integral back-side dual spring arms 120, one dual back-side spring arm for each touch button sensor 120A/B and 120C/D, configured to engage respective mounting posts 12A-B and 12C-D.

FIG. 1B illustrates an example flex sensor 130 including sensor PCB 131 with trace interconnect 134/136 with an interconnect pad 138 for interconnecting to the device PCB 12. The carrier 110 and sensor PCB 131 can include locating features 110L/131L to ensure that the sensor PCB is mounted correctly, for example, to reduce module sensitivity variation as a result of inconsistent sensor placement. Referring also to FIG. 1A, the sensor PCB 131 includes integral spacers 132 affixed to the sensor PCB.

FIG. 1C is a detail illustration for one of the dual spring arm configurations in FIG. 1A 120A/120B.

The design has two spring arms for each touch button 120A/120B and 120C/120d, each one of the spring arms pushes against the spacer elements 132, holding the sensor against the metal surface. Two extra spring arms 120B/120D in the center of the module reduce cross talk between the two buttons. The dual spring arms in this design restrict the sensing area to the button area. Any relative movement between the sensor PCB 131 and the metal surface of the case/sidewall 10 due to user action like pinch and twist outside the button area is absorbed by the spring arms, eliminating false triggers. A provision for screws 16 is available for securing the sensor PCB 131 to the case/sidewall 10, however screws are not necessary. There is only one mechanical piece, the carrier 110, which is mounted using the spring arms eliminating the need for multiple assembly steps and for the use of tools to install the module. The bottom edge of the module is not in contact with the metal surface of the case/sidewall. There are two locating features 131Lon the carrier 110 and the sensor PCB to ensure the flex sensor PCB is mounted correctly and to reduce module to module sensitivity variation as a result of inconsistent sensor placement.

Figure 2:
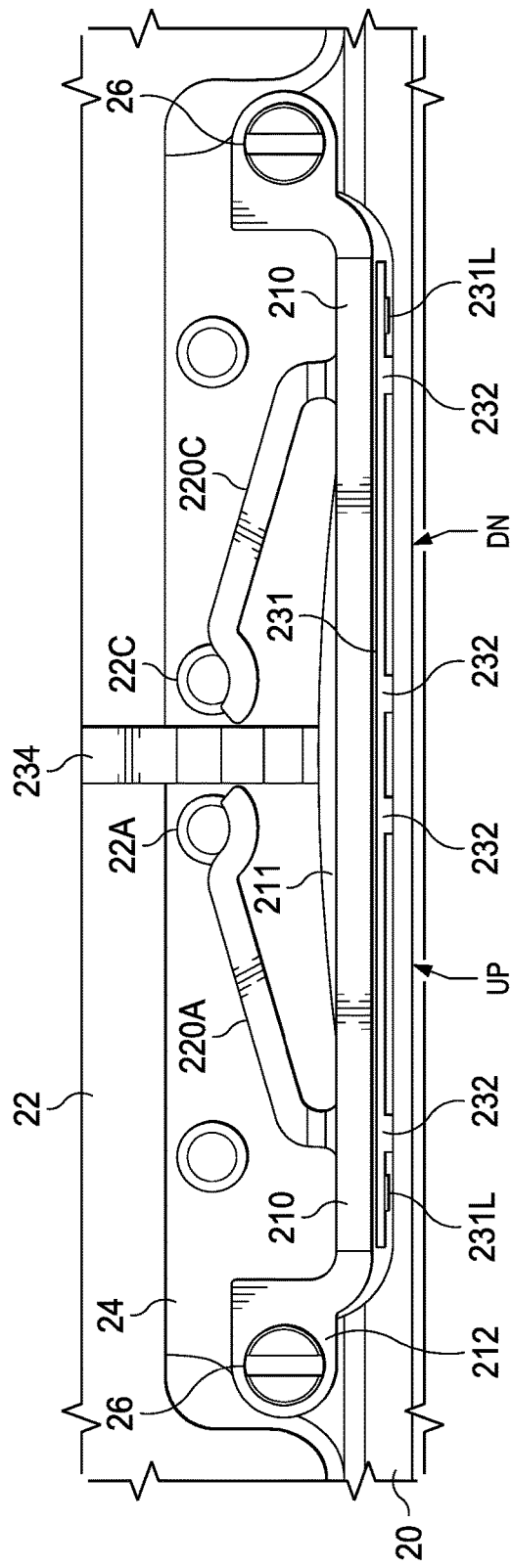
FIGS. 2-4 illustrate alternate example implementations of a touch sensor mounting assembly including integral back-side spring arms.
Figure 3:
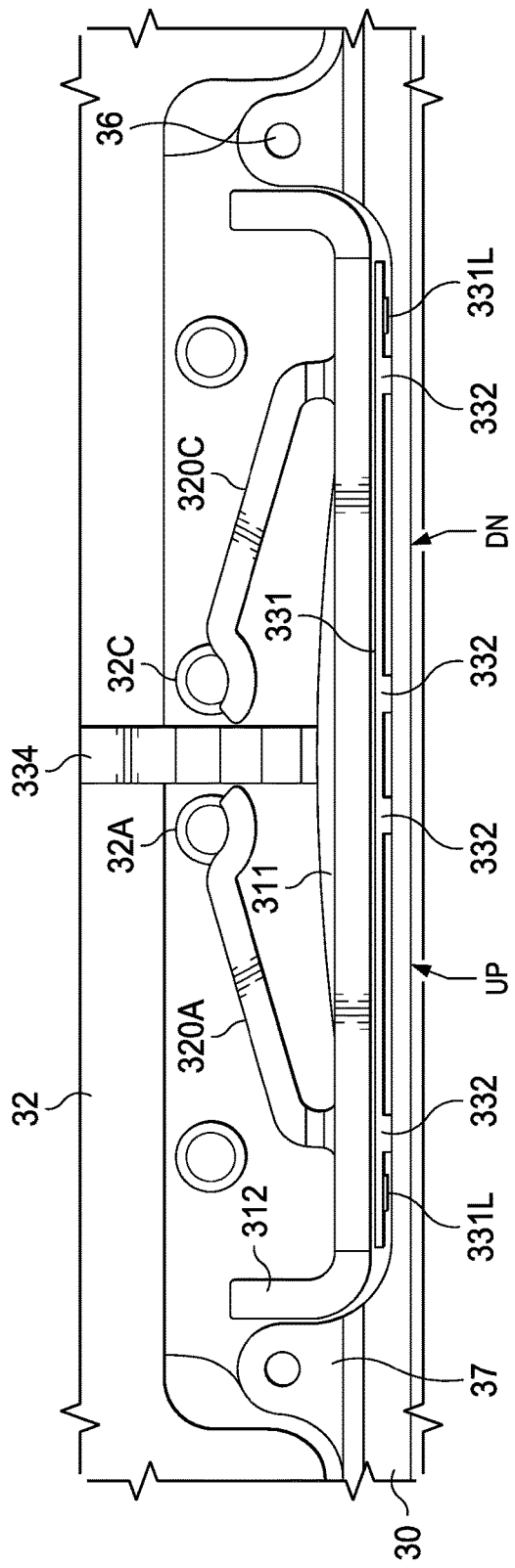
Figure 4:
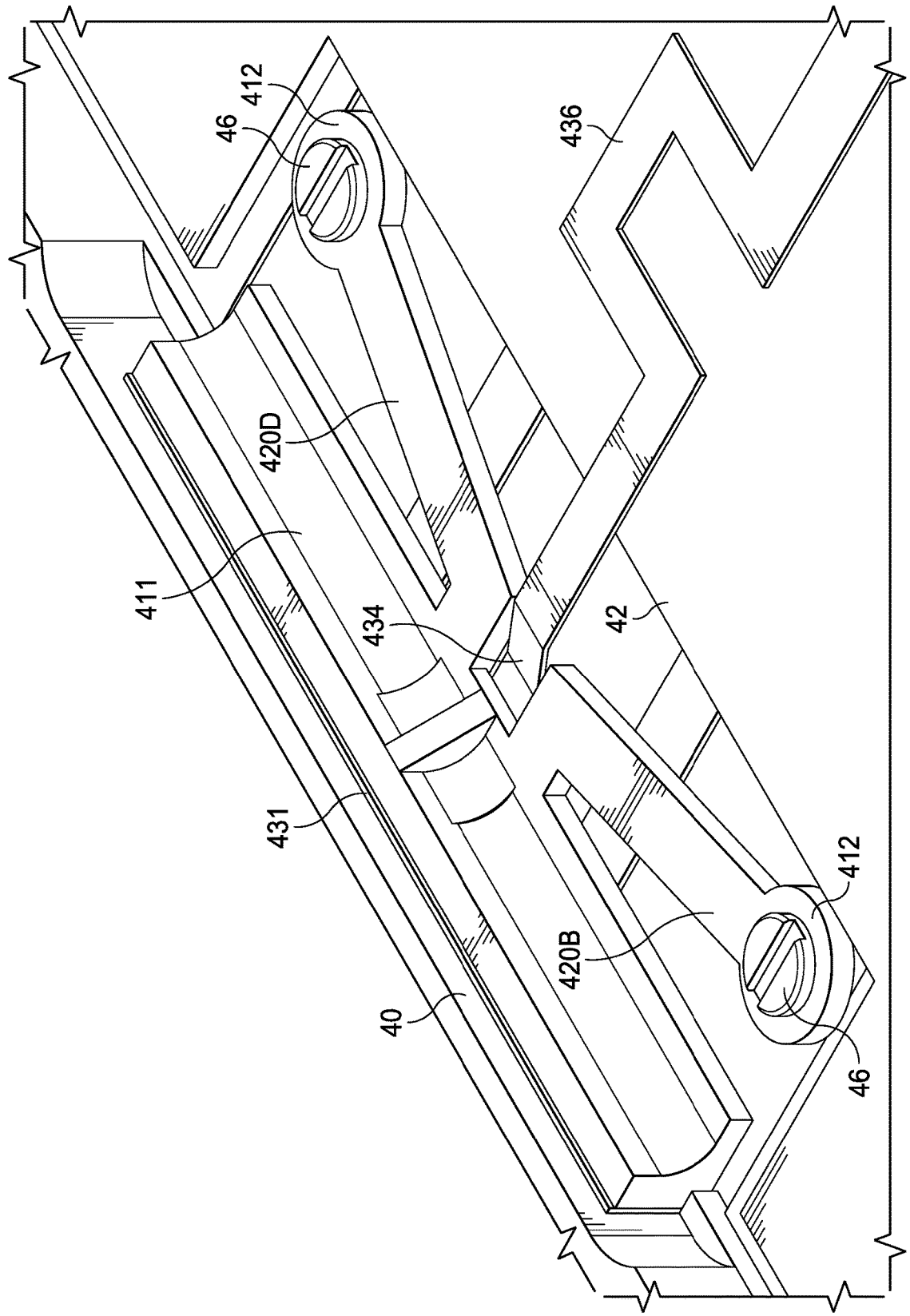

FIGS. 2-4 illustrate alternate example implementations of a touch sensor mounting assembly including integral back-side spring arms.

FIG. 2 illustrates an example alternate spring arm configuration with single spring arms 220A and 220C extending from the outer ends of the carrier stiffening rib 211.

FIG. 3 illustrates an example alternate spring arm configuration with single spring arms 320A and 320C extending from the outer ends of the carrier stiffening rib 311, secured with end flanges rather than bolts.

FIG. 4 illustrates an example alternate spring arm configuration with single spring arms 420B and 420D extending from the inner portion of the carrier stiffening rib 411 including bolt-attachment.

These alternate designs have one spring arm for each touch button along with a stiffening rib 211/311/411 in the middle along the sensor PCB 231/331/431. The spring arms only press in the regions of the spacer elements 232/332 at the outer edges of the sensor. The stiffening rib in the middle translates the spring-arm push force from the edge to the middle.

This spring arm design restricts the sensing region to the button area. Any relative movement between the sensor PCB 231 and the metal surface of the case/sidewall 22/32/42 due to user action like pinch and twist outside the button are absorbed by the spring arms eliminating false triggers. A provision for screws 2636/46 is available for securing the sensor PCB 231/331/431 to the case/sidewall 22/32/42, however screws are not necessary. There is only one mechanical piece, the carrier 210/310/410, which is mounted using a spring arms 220A/220C, 320A/320C, 420A/420C, eliminating the need for multiple assembly steps and for the use of tools to install the module. The single spring arm designs of FIGS. 2-4 is easier to install than the dual spring arm design of FIGS. 1A/1C. There are two locating features 231L/331L on the module for the flex PCB sensor to ensure the flex sensor PCB is mounted correctly and reduces module to module sensitivity variation as a result of inconsistent sensor placement. The bottom edge of the carrier/module is not in contact with the metal surface of the case/sidewall.

FIGS. 5-6 illustrate alternate example implementations of a touch sensor mounting assembly (module) including back-side spring arm retainer(s).

FIG. 5 illustrates an alternate example dual spring-arm retainer configuration with dual spring-arm retainer clips 540A/540B secured to mounting posts 52A/52B.

The module design has three individual pieces: a bowed plastic carrier 512 that provides room for a sensor PCB 530 to be mounted to the module and two spring-arm retainer clips 540A/540B. The spring-arm retainer clips are held in place on the metal surface of case/sidewall 52 using posts 52A/52B. The spring-arm retainer clips slide into the posts and push the carrier 512 and sensor PCB 530 against the spacer elements 532 behind the bowed plastic carrier.

Since the spring-arm retainer clips slide onto the posts, they hold the sensor in place securely without the need for screws. The bottom edge of the carrier/module is not in contact with the metal surface of the case/sidewall. The spring-arm retainer clips of this design restrict the sensing region to the button area. Any relative movement between the sensor PCB and the metal surface of the case/sidewall due to user action like pinch and twist outside the button area is absorbed by the spring-arm retainer clips eliminating false triggers. The individual spring-arm retainer clips for each button greatly reduce cross talk.

FIG. 6 illustrates an alternate example spring-arm retainer 640 configuration with a retainer cross-bar 643 and dual integral spring-arm retainers 641A/641B. This retainer cross-bar configuration uses the PCB structure 62 as a retention stop.

The module design has two individual pieces: a bowed plastic carrier 612 that provides room for the sensor PCB 631 to be mounted to the module and a stiffening spring-arm crossbar 643 with two spring-arm retainers 641A/641B. The stiffening arm crossbar 643 pushes against a physical structure (which can be a FR4 PCB structure or a ridge in the case). The spring arm retainers then push against the spacer elements 632 of the sensor PCB 631, holding the sensor PCB in place. The bottom edge of the module is not in contact with the metal surface of the case/sidewall. The spring-arm crossbar design restricts the sensing region to the button area. Any relative movement between the sensor PCB and the case/sidewall due to user action like pinch and twist outside the button are absorbed by the spring-arm retainer clips eliminating false triggers. There are only two pieces in this mechanical design compared to the dual spring arm design of FIG. 1A which has four.

FIGS. 7-8 illustrate alternate example implementations of a touch sensor mounting assembly including a carrier spring cross-rib 714/814, to engage a retention-tab indent 76/86.

A touch sensor mounting assembly with back-side spring-arms (dual or single configuration) according to this Disclosure eliminates the need for adhesive for holding a touch sensor in place.

Adhesive is replaced by a mechanical module that holds the sensor in place against the device sidewall. Mechanical mount inhibits any force or pressure applied to the phone case outside the button region that results in a relative movement between the sensor PCB and the metal surface which would otherwise result in a false button press.

A mechanical mounting solution is easier to implement in a production line, more secure and resistant to mechanical stress such as a phone drop and twists, reduces cross talk between closely spaced buttons, and improves button sensitivity and consistency.

The mechanical module uses spring structures which can apply a known amount of force in specific regions of a metal touch sensor to hold the sensor in place.

Touch sensing, including detection of a touch-press event/condition can be based on any sensing technology capable of detecting deformation of the touch button segment for the particular application and device design. Examples are inductive and capacitive sensing technologies, using respective sensor configurations and electronics. Implementations of touch deformation sensing technology are not part of this Disclosure, and are not described in detail. For example, inductive sensing can be based on detecting button-press deformation of a touch button segment, configured as a conductive target, toward a spaced sensor coil inductor, causing a change in coil inductance (i.e., a change in the projected magnetic field of the coil inductor driven by the sensor electronics). And, capacitive sensing can be based on detecting button-press deformation of a touch button segment toward a capacitive electrode, causing a change in projected electric field detected as a change in capacitance.

For an example implementation based on inductive sensing, the sensor electronics can be designed to provide excitation current drive to the sensor inductor coil (creating a projected time varying magnetic sensing field), and to measure a sensor inductor coil characteristic (such as inductance or Q-factor) indicative of the position of the touch button segment (conductive target) relative to the sensor inductor coil, including deflection of the touch button segment toward the sensor inductor coil in response to a touch-press condition.

The Disclosure provided by this Description and the Figures sets forth example embodiments and applications illustrating aspects and features of the invention, and does not limit the scope of the invention, which is defined by the claims. Known circuits, connections, functions and operations are not described in detail to avoid obscuring the principles and features of the invention. These example embodiments and applications, including example design implementations, can be used by ordinarily skilled artisans as a basis for modifications, substitutions and alternatives to construct other embodiments, including adaptations for other applications.

The invention claimed is:

1. An assembly for mounting at least one touch sensor, for use in a system including a device case with at least on touch button area defined on a surface of the device case, the touch sensor mounting assembly comprising:
    a carrier including a front-side sensor-attach surface;
    a back-side spring structure including at least two spring arms integral with the carrier, the spring arms configured, when mounted in a device adjacent a touch button area, to urge the carrier and front-side sensor-attach surface in a direction of a touch button area.

2. The touch sensor mounting assembly of claim 1,
    wherein touch sensor circuitry is mounted on the front-side sensor-attach surface of the carrier; and
    wherein, the touch sensor mounting assembly is installed in the device case adjacent the at least one touch button area, such that the back-side spring arms are flexed to urge the carrier with front-side mounted touch sensor circuitry toward an interior side of the touch button area of the device case.

3. The touch sensor assembly of claim 1, wherein the back-side spring structure includes dual back-side crossed spring arms.

4. The touch sensor assembly of claim 1,
    wherein the devices case includes first and second adjacent touch button areas; and
    wherein the carrier includes a front-side sensor-attach surface dimensioned for respective first and second touch sensor circuits.

5. The touch sensor assembly of claim 4, wherein the back-side spring structure includes dual crossed spring arms for each of the first and second touch sensor circuits.

* * * * *